US012523075B2

(12) United States Patent
Hall

(10) Patent No.: US 12,523,075 B2
(45) **Date of Patent: *Jan. 13, 2026**

(54) DOOR LEAF AND DOOR SYSTEM

(71) Applicant: KINGSWAY ENTERPRISES (UK) LIMITED, Sidcup (GB)

(72) Inventor: Benjamin Hall, Kent (GB)

(73) Assignee: Kingsway Enterprises (UK) Limited, Kent (GB)

( * ) Notice: Subject to any disclaimer, the term of this patent is extended or adjusted under 35 U.S.C. 154(b) by 79 days.

This patent is subject to a terminal disclaimer.

(21) Appl. No.: 18/002,522

(22) PCT Filed: Jan. 28, 2022

(86) PCT No.: PCT/GB2022/050229
§ 371 (c)(1),
(2) Date: Dec. 20, 2022

(87) PCT Pub. No.: WO2022/162378
PCT Pub. Date: Aug. 4, 2022

(65) Prior Publication Data

US 2023/0358086 A1 Nov. 9, 2023

(30) Foreign Application Priority Data

Jan. 28, 2021 (GB) ...................................... 2101191

(51) Int. Cl.

| | |
|---|---|
| ***E05D 11/06*** | (2006.01) |
| ***E05D 7/081*** | (2006.01) |
| ***E06B 3/36*** | (2006.01) |
| ***E06B 3/80*** | (2006.01) |

(52) U.S. Cl.
CPC .............. *E05D 7/081* (2013.01); *E05D 11/06* (2013.01); *E06B 3/36* (2013.01); *E06B 3/80* (2013.01); *E05Y 2800/424* (2013.01); *E05Y 2900/132* (2013.01)

(58) Field of Classification Search
None
See application file for complete search history.

(56) References Cited

U.S. PATENT DOCUMENTS 2,279,572 A 4/1942 Kann
2,642,164 A 6/1953 Mclean
2,774,117 A * 12/1956 Eckel ........................ E06B 3/88 49/460

(Continued)

FOREIGN PATENT DOCUMENTS

DE 4305977 C2 * 10/1996 ............... A47K 3/36
DE 202006010981 U1 * 1/2007 ............... A47K 3/36

(Continued)

OTHER PUBLICATIONS

Great Britain Patent Application GB2101191.1, Search and Examination Report under Section 18 (3), issued Jul. 29, 2021.

(Continued)

*Primary Examiner* — Phi D Tran
(74) *Attorney, Agent, or Firm* — Erise IP, P.A.

(57) ABSTRACT

The present disclosure relates to a door leaf formed of a flexible material, wherein the flexible material is resistant to puncture and resistant to tearing; and to a door system comprising the door leaf.

20 Claims, 7 Drawing Sheets

(56) References Cited

U.S. PATENT DOCUMENTS

| | | | | | |
|---|---|---|---|---|---|
| 3,325,943 | A * | 6/1967 | Kochis | E06B 7/28 | 49/502 |
| 3,827,183 | A | 8/1974 | Zimmerman et al. | | |
| 3,979,872 | A * | 9/1976 | Gilchrist | E06B 3/80 | 160/354 |
| 4,218,104 | A | 8/1980 | Anderson et al. | | |
| 4,292,764 | A | 10/1981 | Kochis | | |
| 4,686,806 | A | 8/1987 | Bennett | | |
| 5,693,271 | A * | 12/1997 | Johnson | E06B 3/86 | 264/46.7 |
| 7,152,377 | B2 * | 12/2006 | Falato | E05F 1/063 | 52/316 |
| 8,752,245 | B2 | 6/2014 | Duffy | | |
| 11,193,325 | B2 * | 12/2021 | Clark | E06B 5/00 | |
| 11,708,713 | B2 * | 7/2023 | Colligan | E05D 15/54 | 49/177 |
| 11,718,383 | B2 | 8/2023 | Nakao | | |
| 2004/0107672 | A1 * | 6/2004 | Falato | E05F 1/043 | 52/784.1 |
| 2006/0090401 | A1 | 5/2006 | Berry et al. | | |
| 2007/0151164 | A1 | 7/2007 | Marshall | | |
| 2012/0118882 | A1 | 5/2012 | Holland et al. | | |
| 2018/0325326 | A1 | 11/2018 | Hall | | |
| 2019/0003248 | A1 | 1/2019 | Bailey | | |

FOREIGN PATENT DOCUMENTS

| | | | | |
|---|---|---|---|---|
| DE | 202014001594 | U1 | 4/2014 | |
| EP | 0713633 | A1 | 5/1996 | |
| EP | 2548486 | A1 * | 1/2013 | A47K 3/36 |
| EP | 3730018 | A1 | 10/2020 | |
| FR | 2865233 | A1 | 7/2005 | |
| GB | 2580673 | A | 7/2020 | |
| SE | 523996 | C2 * | 6/2004 | A47K 3/36 |
| SE | 529220 | C2 * | 6/2007 | A47K 3/36 |
| WO | WO-2004071252 | A1 * | 8/2004 | E06B 9/54 |
| WO | WO-2005102128 | A1 * | 11/2005 | A47K 3/36 |
| WO | 2014134545 | A1 | 9/2014 | |

OTHER PUBLICATIONS

PCT Patent Application No. PCT/GB2022/050229 International Search Report and Written Opinion issued Apr. 25, 2022.

Great Britain Patent Application No. 2101191.1 Combined Search and Examination Report issued Jan. 25, 2022.

U.S. Appl. No. 19/234,969, Non-Final Office Action issued Jul. 30, 2025.

* cited by examiner

DOOR LEAF AND DOOR SYSTEM

RELATED APPLICATION

The present application is a national stage application under 35 U.S.C. § 371 of International Application No. PCT/GB2022/050229, filed 28 Jan. 2022, which claims priority from Great Britain Patent Application No. 2101191.1, filed 28 Jan. 2021. The above-referenced applications are incorporated by reference.

FIELD

The present disclosure relates to a door leaf and door system for preventing self-harm.

BACKGROUND

In psychiatric hospitals and prisons, a problem exists that patients and inmates may wish to cause themselves harm using a ligature created by securing a rope or cable around an available anchor point in a room. One solution to this problem is to design room fixtures and fittings such that they do not provide such anchor points. Many bespoke fixtures and fittings exist for psychiatric hospitals and prisons, with this aim in mind. However, suicides in psychiatric hospitals and prisons remain a problem. Patients and inmates continue to find anchor points from which to secure a ligature and cause themselves harm.

One particular problem area is door systems. When a door leaf of a door system is opened, a pinch point is created between the door leaf and the door frame, or wall, to which the door leaf is attached. A patient or inmate may anchor a rope or cable from this pinch point, thereby creating a ligature with which to cause themselves harm. One approach for addressing this problem is to shape the outer surface of the door leaf to reduce the pinch point. Similarly, various hinge designs have been trialed for reducing such pinch points. Unfortunately, however, such approaches do not entirely eliminate such pinch points.

A further problem exists that patients or inmates may try to pierce or puncture fixtures, fittings and furniture in their room, for example using a pen, in order to create an anchor point through which a ligature can be passed. Similarly, patients or inmates may try to tear soft furnishings in their room to create such an anchor point.

SUMMARY

The door leaf and door system according to the present disclosure have been developed to address the problems noted above.

In a first aspect there is provided a door leaf formed of a flexible material, wherein the flexible material is resistant to puncture and resistant to tearing. The material may have a high tensile strength, for example a tensile strength sufficient to prevent puncture by a pen and/or sufficient to prevent tearing by hand.

The door leaf may be flexible (e.g. bendable) when force is applied thereto. The door leaf may be flexible at least in the areas that otherwise could be used to trap a ligature against an adjacent structure, and such that the door leaf cannot be used to trap a ligature against the adjacent structure. For example, the flexible material may be located at least along the edges of the door leaf that are for attachment to, or abutment with, an adjacent structure (e.g. along the closing edge of the door leaf, and/or along the edge which opposes the closing edge of the door leaf). In another example, the flexible material may be located along the peripheral edges of the door leaf. In another examples, the entire door leaf may be flexible, for example substantially the entire area of the door leaf may comprise the flexible material. This latter example may also be simple to construct.

Because the door leaf is flexible (e.g. bendable), it does not provide a stable anchor point from which to secure a ligature. In particular, if a patient or inmate were to try anchoring a rope or cable within a pinch point formed between the door leaf and another object, the surface of the door leaf will bend and deform such that the anchoring force is small. Accordingly, even a small force will free the ligature from the pinch point, such that a patient or inmate can't cause themselves harm.

Additionally, because the flexible material has a high tensile strength, it is resistant to puncturing and tearing, such that a patient or inmate cannot puncture (for example with a pen) or tear (for example by hand) the door leaf in order to create a ligature point. Therefore, patients and inmates are not able to pass a rope or cable through the door leaf itself to create a ligature. They also are not able to create an anchor point by tearing the door leaf.

The flexible material have a tensile strength of at least 300 MPa, e.g. at least 400 MPa, e.g. at least 500 MPa, e.g. at least 750 MPa. In some examples, the flexible material may have a tensile strength of at least 1000 MPa, e.g. at least 1500 MPa, e.g. at least 2000 MPa. The flexible material may comprise at least one woven sheet, wherein the sheet is woven from fibres having a tensile strength of at least 300 MPa, for example at least 500 MPa, such as at least 1000 MPa. Using such a material has the advantage of maintaining flexibility to ensure that pinch points are avoided, while at the same time ensuring that puncture and tearing is not possible. This is vastly beneficial relative to using common plastics as a flexible door leaf material, because common plastics can be torn and punctured with relative ease, to thereby create anchor points.

The flexible material may comprise aramid fibre, for example para-aramid fibre. Typically, the flexible material may comprise at least one woven aramid fibre sheet. Aramid fibres are flexible. Aramid fibres also have a very high tensile strength. Therefore, the inclusion of aramid fibres helps to ensure that the door leaf is resistant to puncture and tearing, while ensuring flexibility to prevent pinch points as discussed above. Kevlar® may be used as the aramid fibre. Alternatively, Twaron® may be used. Each of these is an aramid fibre with a high tensile strength.

The door leaf may further comprise a skin (e.g. flexible skin) covering the flexible high tensile strength material. In this regard, the flexible high tensile strength material may be considered as a core of the door leaf. For example, the door leaf may comprise a laminate material comprising a flexible high tensile strength core sandwiched between two skin layers. The skin may provide structural support to the flexible high tensile strength material, thereby ensuring that the door leaf maintains its shape during normal operation (while at the same time ensuring that the door leaf can bend when necessary to avoid dangerous pinch points as described above).

The skin may be adhered (e.g. glued) to the core. The flexible skin may be adhered to the core using epoxy resin. The epoxy resin may be flexible once cured. The act of gluing the skin to the core (e.g. as a laminate structure comprising the core sandwiched between two skin layers) may help to provide structural support.

The skin may comprise a polymer, for example a non-aramid polymer. The skin may comprise polyvinyl chloride (PVC). The flexible skin may comprise nylon and PVC, for example woven nylon with a PVC coating. For example, high tenacity plain weave nylon may be used. The PVC may be plasticised PVC. The use of such materials has been found to further improve the structural characteristics of the door leaf, by further providing sufficient rigidity for the door leaf to maintain its shape in normal situations, and sufficient flexibility to avoid pinch points.

The flexible skin may further improve the visual appearance of the door leaf, and may provide a wipe-down surface. It may therefore improve sanitation, by providing an easily cleaned surface.

In some examples, the door leaf may comprise a composite comprising at least one woven high tensile sheet as described above, and at least one flexible sheet. The at least one flexible sheet may comprise PVC and optionally nylon, as described above.

The door leaf may comprise a hinge pin attached along an edge thereof. The hinge pin may extend along an entire length of the door leaf. The door leaf may comprise a channel extending along an edge thereof, for receiving a hinge pin. The channel may extend along substantially the entire length of the edge. The channel may facilitate easy assembly of a door system to include the door leaf, e.g. by passing a hinge pin through the channel. The channel may comprise a rigid tube. For example, the channel may comprise a metal (e.g. aluminium) tube. The flexible material may be attached to the tube, e.g. along the length of the tube. The skin may cover the flexible (core) material and the tube.

The top edge of the door leaf may form an acute angle with the channel. Therefore, when installed as part of a door system in which the channel has a vertical orientation, the top edge of the door leaf may slope downwards as it extends away from the channel. Further, the corners of the door leaf distal from the channel may be rounded. A ligature looped over the top edge of the door leaf may therefore be encouraged to slide off the door leaf. Accordingly, safety is further improved.

In a second aspect there is provided a door system comprising a door leaf, an attachment member, and an attachment means, wherein the attachment means rotationally couples the door leaf to the attachment member and is configured to restrict rotation of the door leaf relative to the attachment member to less than 180 degrees. For example, the attachment means may be arranged to limit the rotational travel of the door leaf to less than 180 degrees (for example 90 degrees in either direction).

By restricting rotation of the door leaf relative to the attachment member as above, a patient is not able to rotate the door leaf sufficiently to create a stable pinch point between the door leaf and the attachment member.

In a third aspect there is provided a door system comprising a door leaf according to the first aspect, an attachment member, and an attachment means, wherein the attachment means rotationally couples the door leaf to the attachment member. The attachment means may be configured to restrict rotation of the door leaf relative to the attachment member to less than 180 degrees. For example, the attachment means may be arranged to limit the rotational travel of the door leaf to 180 degrees.

As the reader will understand, a rotational restriction of 180 degrees means that the door can be rotated no further than 90 degrees outwards from a 'closed' position, and 90 degrees inwards from the 'closed' position.

Further optional features of the second and third aspects are provided below.

The attachment means may be configured to restrict rotation of the door leaf relative to the attachment member to less than 150 degrees. In some examples, the attachment means may be configured to restrict rotation of the door leaf relative to the attachment member to less than 130 degrees. A smaller angle, such as 150 degrees or 130 degrees, further helps to ensure that a stable pinch point cannot be created between the door leaf and the attachment member. However, the angle should be large enough to ensure that the room partitioned by the door system can be easily accessed. Both 150 degrees or 130 degrees achieve this.

The attachment means may comprise a hinge pin and an end-cap. The hinge pin may extend along an edge of the door leaf, for example extend through a channel which extends along the edge of the door leaf. The end-cap may be attached to the attachment member. An end of the hinge pin may be received within the end-cap to thereby rotationally couple the door leaf to the attachment member. For example, a first end of the hinge pin may be received within a first end-cap and a second end of the hinge pin may further be received within a second end-cap, to thereby rotationally couple the door leaf to the attachment member. Each of the first end-cap and the second end-cap may be attached to a respective end of the attachment member. The end-caps may be substantially identical to one another. The or each end cap may have a rounded or sloped outer surface, to further eliminate ligature points.

When assembled, the first end-cap may abut a first end of the channel, and the second end-cap may abut a second end of the channel, with no gaps therebetween. Accordingly, any ligature points may be further eliminated.

The attachment member may comprise a recess configured to receive the channel. An outer diameter of the channel may be equal to a width of the recess. The recess may be defined between two opposing jaws of the attachment member. The spacing of the jaws may be equal to the outer diameter of the channel. The jaws may have a curved or sloped outer surface. Accordingly, any ligature points at the interface between the channel and the door leaf may be eliminated.

One of the end-cap and the hinge pin may comprise at least one detent arranged to restrict rotation of the hinge pin and thereby restrict rotation of the door leaf relative to the attachment member. The other of the end-cap and the hinge pin may comprise a corresponding protrusion, wherein the at least one detent is arranged to engage the protrusion to thereby restrict rotation of the hinge pin. For example, the at least one detent may engage (e.g. abut) the protrusion when the hinge pin reaches the limit of its prescribed rotational travel. The hinge pin may comprise the protrusion, and the end-cap may comprise the at least one detent. The protrusion may extend from an axial end of the hinge pin, so as to be received within the end-cap. In use, the protrusion and the detent may be concealed within the end-cap. Accordingly, ligature points may be avoided.

Where the door system includes a first end-cap and a second end-cap, each of the first and second end-caps may comprise one of a protrusion and a detent as described above; and each end of the hinge pin may comprise the other of a protrusion and a detent. For example, each end-cap may comprise at least one detent as described above; and each end of the hinge pin may comprise a protrusion as described above.

The door system may further comprise a flexible (e.g. rubber) fixing member for attachment between the attachment member and a wall or door frame. The fixing member may comprise sloped or rounded outer surfaces, to further eliminate ligature points.

BRIEF DESCRIPTION OF THE DRAWINGS

Examples of the present disclosure will now be described, by way of example only, with reference to the accompanying figures, in which.

Like reference numerals are used for like components throughout the drawings and detailed description.

DETAILED DESCRIPTION

Figure 1:
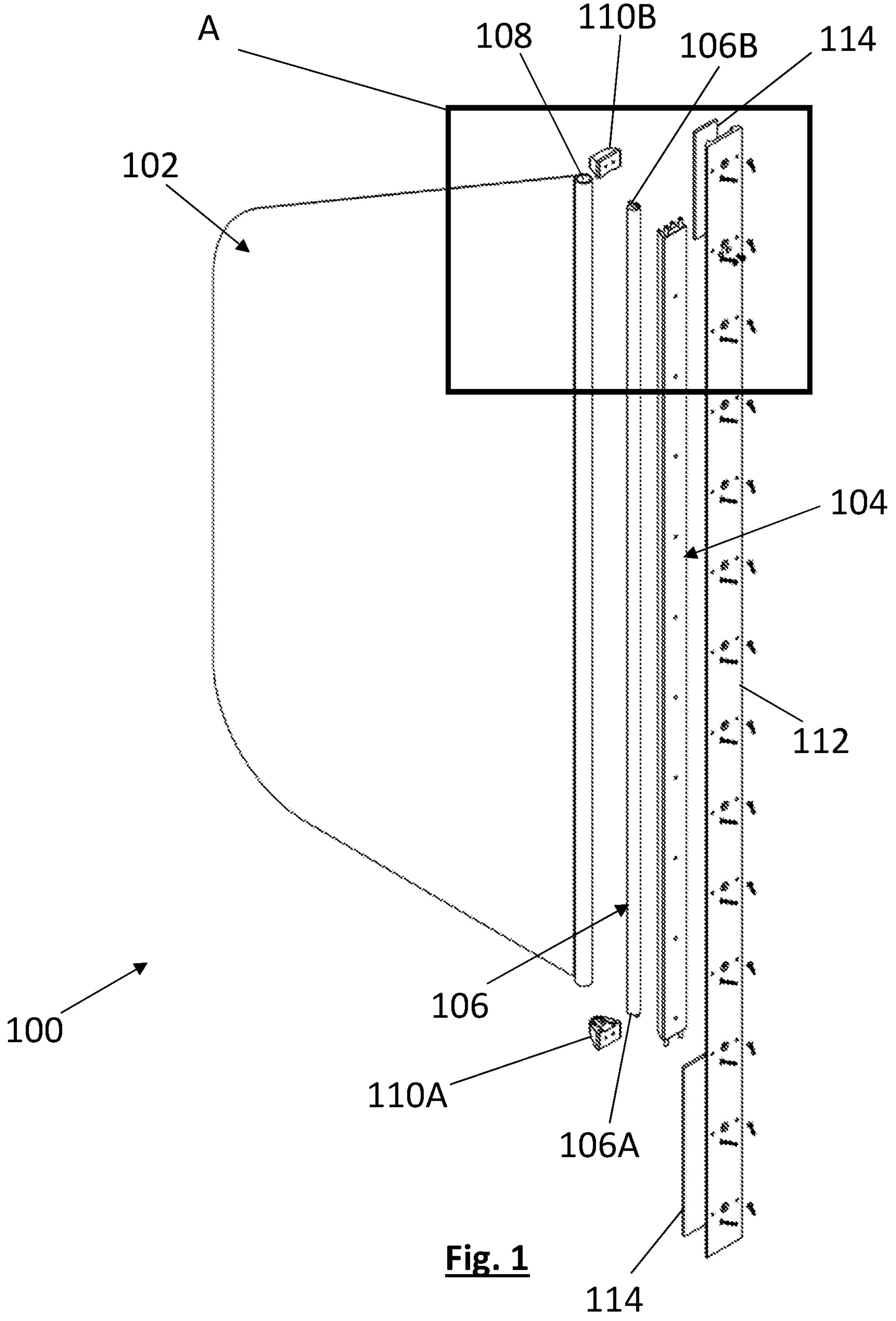
FIG. 1 shows an exploded view of a door system.
Figure 2:
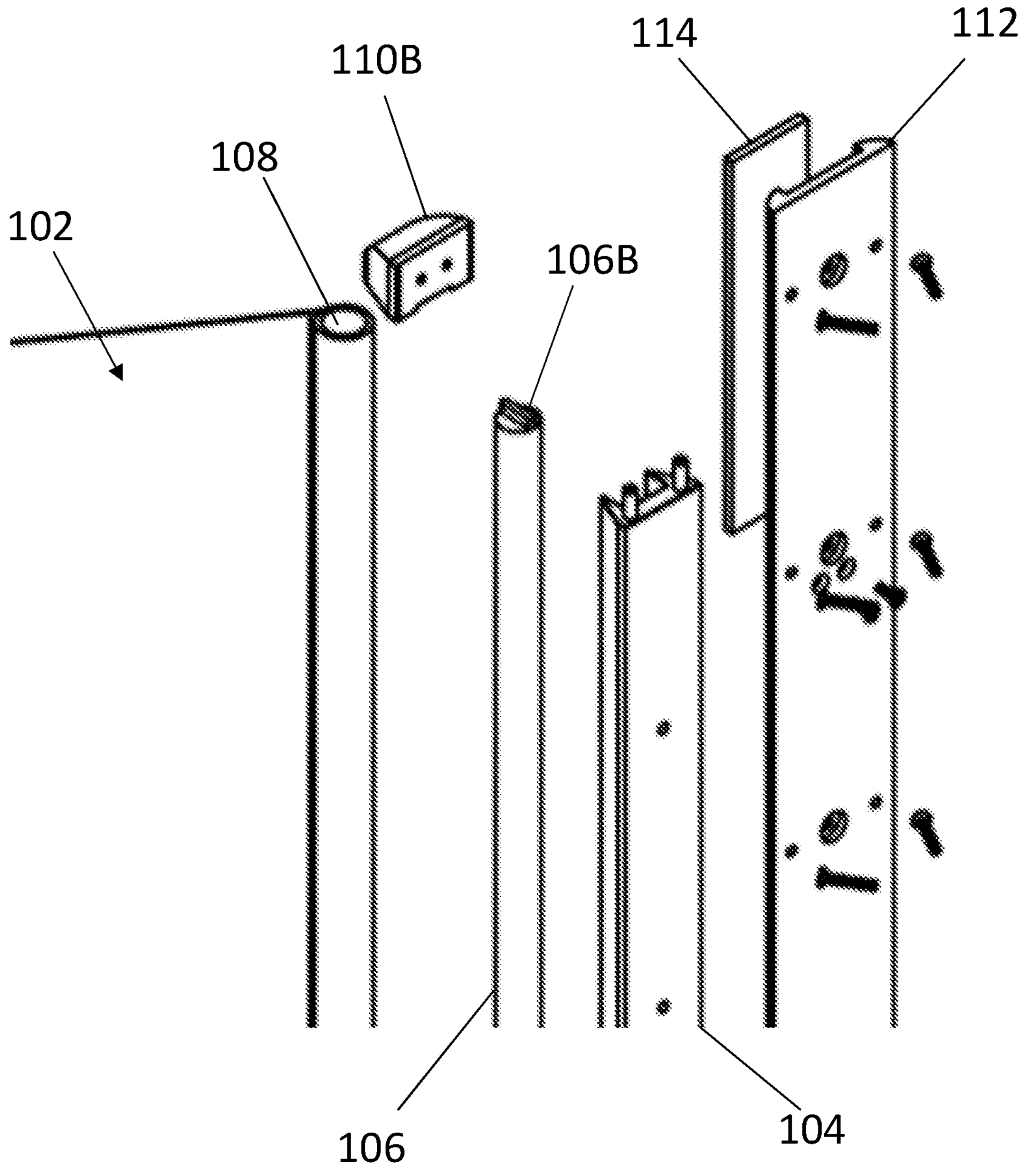
FIG. 2 shows a magnified view of region A in FIG. 1.
Figure 3:
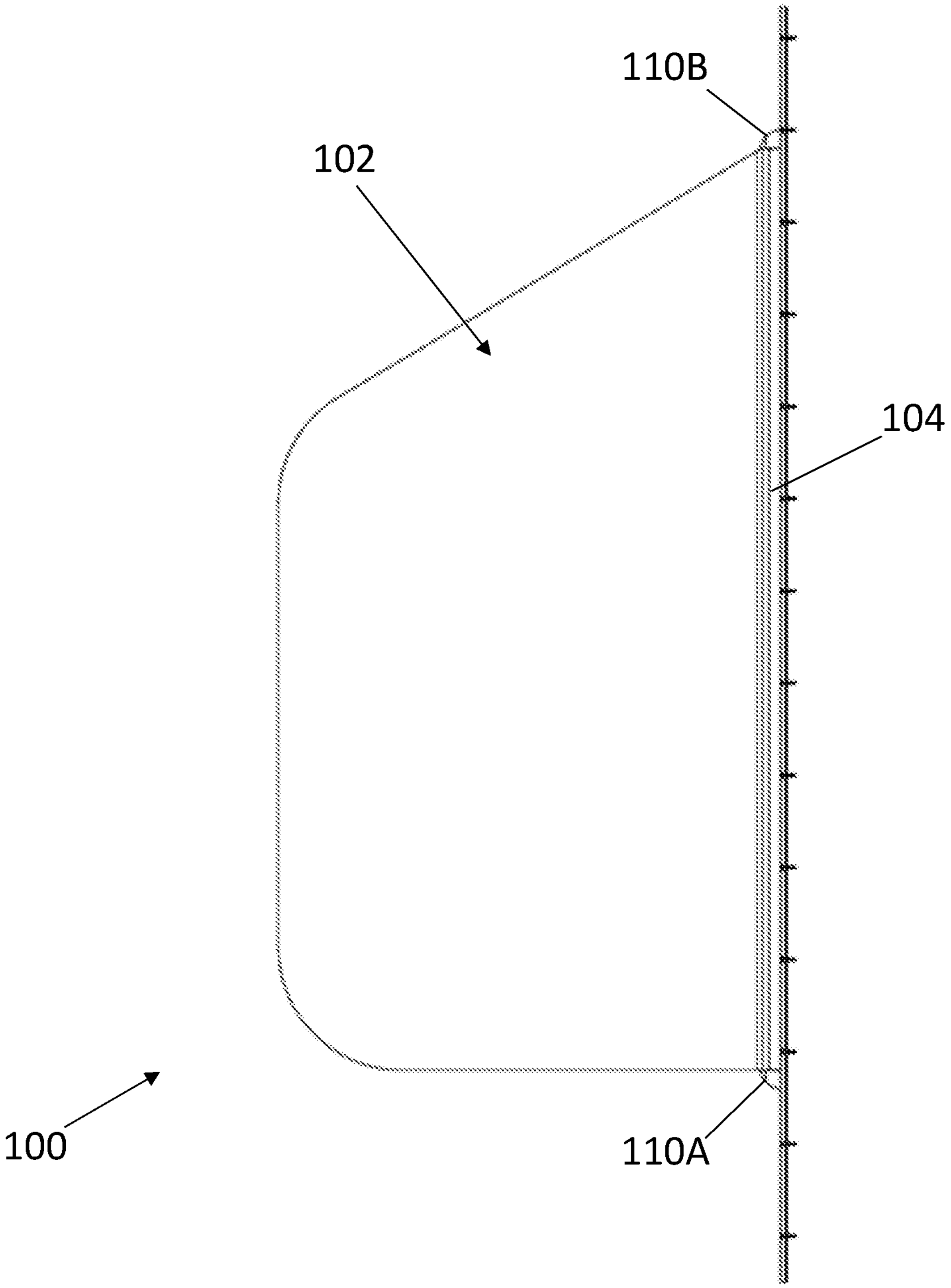
FIG. 3 shows an assembled view of the door system in FIG. 1.

FIGS. 1 and 3 respectively show an exploded view and an assembled view of a door system 100 according to the present disclosure. FIG. 2 shows a magnified view of region A in FIG. 1.

The door system of FIGS. 1 to 3 comprises a door leaf 102, which is attached to an attachment member 104 by an attachment means. The attachment means comprises a steel hinge pin 106 and first and second end-caps 110A, 110B. To assemble the shower door, the hinge pin 106 is inserted into a channel 108 of the door leaf 102, such that the first and second ends 106A, 106B of the hinge pin 106 protrude from respective ends of the channel 108. The first end 106A is then inserted into first end-cap 110A which in turn is attached to the attachment member 104; and the second end 106B is inserted into the second end-cap 110B, which in turn is also attached to the attachment member 104. Therefore, when assembled, the hinge pin is received in the channel 108, the first end 106A of the hinge pin is received within first end-cap 110A; and the second end 106B of the hinge pin is received within the second end-cap 110B. End-caps 110A and 110B are attached to the attachment member 104, thereby coupling the door leaf 12 to the attachment member 104. The hinge pin 106 is a snug fit in the channel 108, which may thereby substantially prevent rotation of the hinge pin 106 relative to the door leaf 102. In some examples, the hinge pin 106 may be glued in place within the channel 108. However, the end-caps 110A, 110B support rotation of the hinge pin 106. Therefore, the attachment means (which collectively comprises the hinge pin and the end-caps) supports rotation of the door leaf 102 relative to the attachment member 104. As will be described in further detail below, the attachment means is further configured to limit the rotation of the door leaf relative to the attachment member.

Also shown in FIGS. 1-3 are a fixing member 112, and a fixing member inserts 114. The fixing member 112 is for attachment between the attachment member 104 and a wall or door frame.

Figure 4:
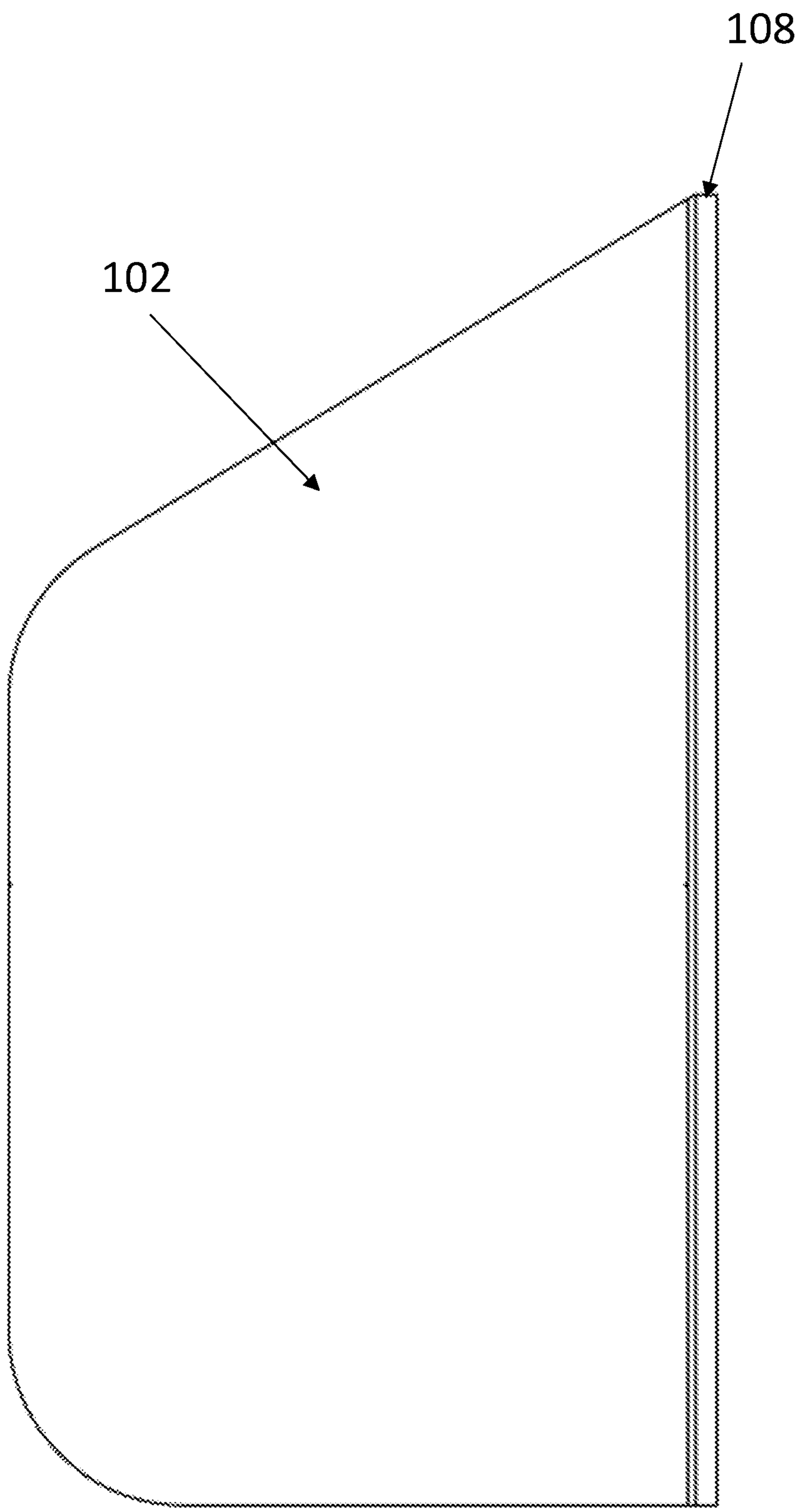
FIG. 4 shows a side-view of a door leaf from the door system of FIG. 1.
Figure 5A:
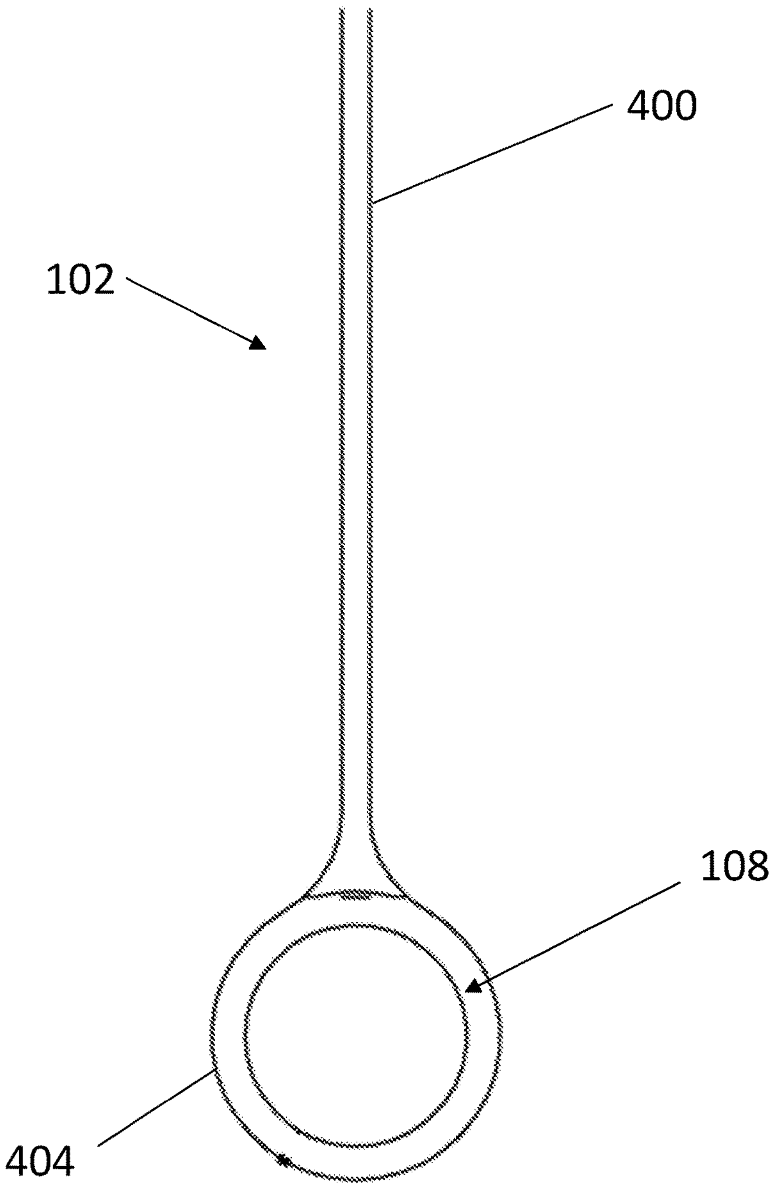
FIG. 5*a* shows a partial end-view of the door leaf in FIG. 4.
Figure 5B:
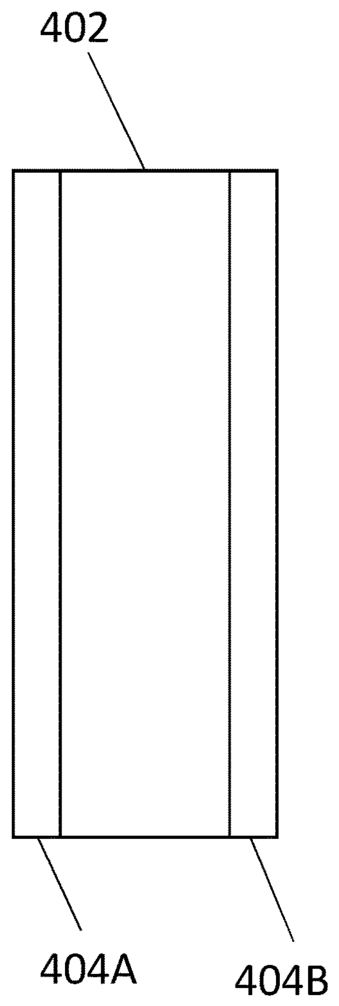
FIG. 5*b* illustrates the laminate structure of the door leaf in FIG. 4.

FIGS. 4 and 5*a* respectively show a side-view and an end-view of the door leaf 102. FIG. 4 shows the sloped top edge and rounded corners of the door leaf. The door leaf comprises a flexible laminate 400. The structure of the flexible laminate 400 is shown in FIG. 5*b*. The flexible laminate 400 comprises a woven Kevlar® core layer 402 sandwiched between a first flexible skin layer 404A and a second flexible skin layer 404B. Each flexible skin layer comprises plasticised PVC-coated high tenacity plain weave nylon. The skin layers 404A, 404B encapsulate the core layer 402. The layers of the flexible laminate 400 are adhered to one another using epoxy resin.

Where the two skin layers 404A, 404B meet each other at the edges of the door leaf to thereby seal the core layer 402, they may be sealed, e.g. by impulse welding, to thereby ensure a safe and clean finish that is both durable and hygienic.

Further details of an exemplary material for the skin layers 404A, 404B will now be provided. The exemplary material is a PVC-coated woven nylon fabric. The woven nylon fabric is a high tenacity plain weave nylon with a linear density of 940 dtex and an area density of 170 gsm. It is coated with pigmented, plasticised PVC. The PVC is antifungal, UV stabilised, flame resistant, and non-toxic. The material of the layers 404A, 404B has a coated weight of at least 600 gsm; a tensile strength (in the warp direction) of at least 2650 N/50 mm; a tensile strength (in the weft direction) of at least 2200 N/50 mm; a tear strength (in the warp direction) of at least 400N; a tear strength (in the weft direction) of at least 300N; and a coating adhesion of at least 100 N/50 mm. It complies with regulation (EC) no. 1907/2006 (Registration, Evaluation, Authorisation and restriction of Chemicals).

As shown in FIG. 5*a*, the channel 108 comprises a hollow aluminium tube. The hollow aluminium tube is covered by the skin layer 404. In other words, the skin layer 404 covers the entire door leaf, including the core 402 and the aluminium tube to which the core 402 is attached. The aluminium tube is cylindrical. The interface between the core 402 and the aluminium tube is rounded, to avoid a pinch point.

Figure 6:
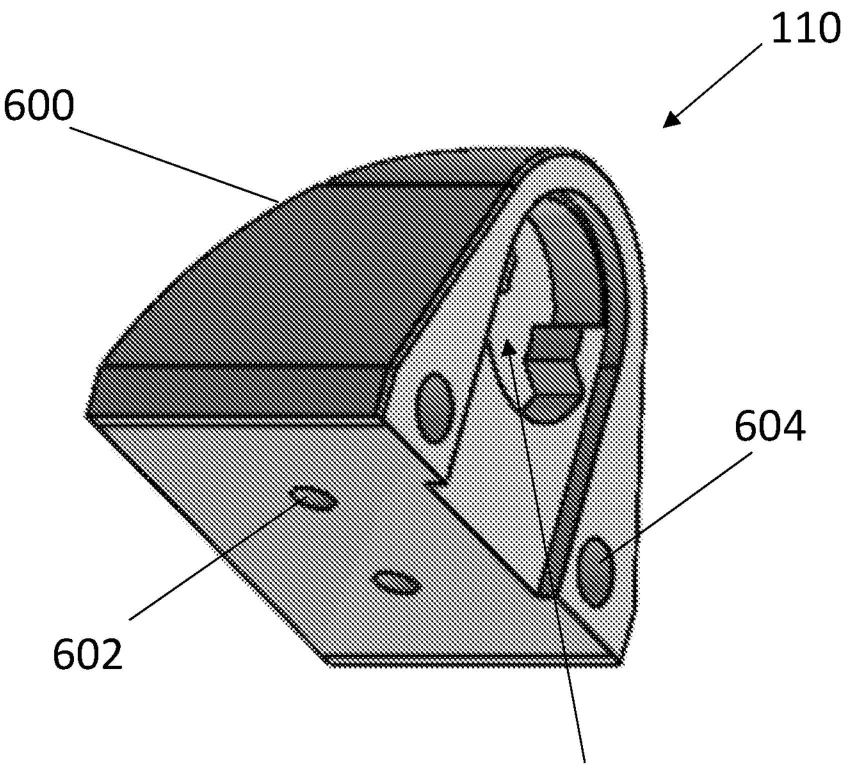
FIG. 6 shows a perspective view of an end-cap from the door system of FIG. 1.
Figure 7:
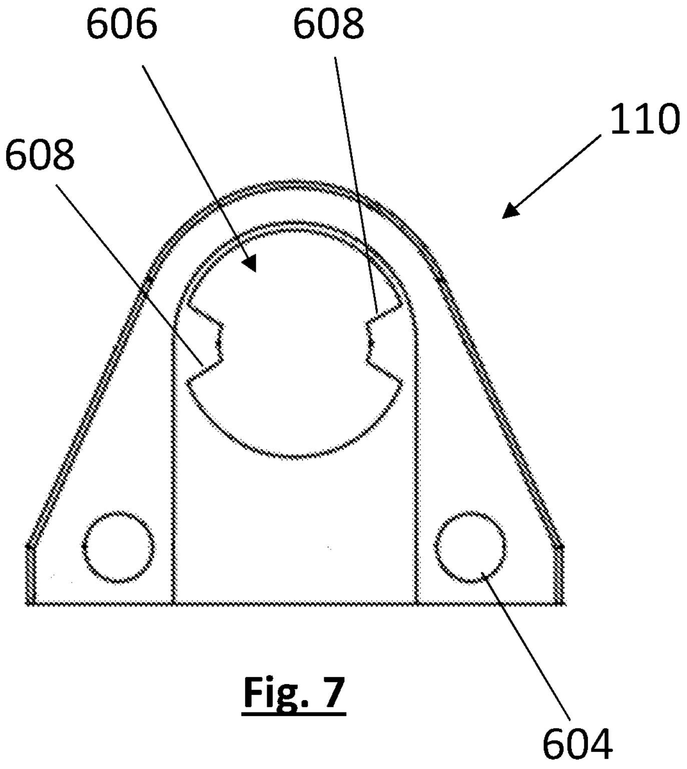
FIG. 7 shows an end-view of the end-cap in FIG. 6.

FIG. 6 shows a perspective view of an end-cap 110 from the door system in FIG. 1. As shown, the end-cap has a rounded and sloped outer surface 600; fixing points 602 for attachment to the fixing member 112 and/or a wall; fixing points 604 for attachment to the attachment means 104; and a generally circular cavity 606 for receiving the hinge pin 106. The end-cap 110 is formed of aluminium. As the reader will understand, the top cap 110 of FIG. 6 could be used as the first end-cap 110A, or as the second end-cap 110B.

Figure 8:
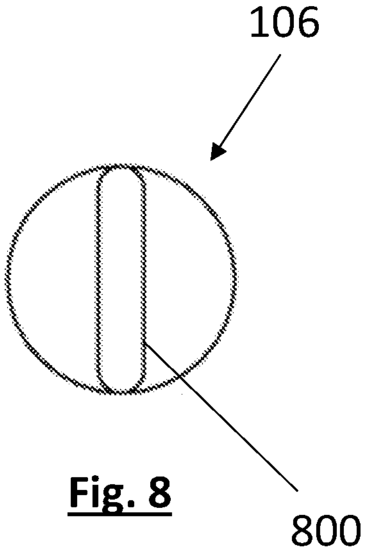
FIG. 8 shows an end-view of a hinge pin from the door system of FIG. 1.

Also shown are detents 608 within the cavity 606. The detents are arranged to a engage protrusion 800 at a respective axial end of the hinge pin 106 (shown in FIG. 8), when the hinge pin is rotated relative to the end-cap 110. As the reader will understand, when the axial end of the hinge pin 106 is inserted into the cavity 606, it will be able to rotate within the cavity 606 due to the cylindrical shape of the hinge pin 106 and the corresponding circular shape of the cavity 606 (the diameter of the hinge pin 106 is substantially the same as the diameter of the cavity 606). However, because of the provision of the flange-shaped protrusion 800, the rotational motion of the hinge pin 106 relative to the end-cap 110 will be limited. In particular, when rotated in either direction within the end-cap 110, the protrusion 800 will eventually come into abutment with the detents 608, thereby preventing further rotation of the hinge pin 106. Accordingly, rotation of the hinge pin relative to the end-cap 110 (and thus of the door leaf 102 relative to the attachment member 104) is limited by the engagement between the detents 608 and the protrusion 800.

The positioning of the detents 608 can be selected as desired, in order to select the extend to which the door leaf 102 is rotatable relative to the attachment member 104. In the depicted example, the detents 608 limit rotation to about 130 degrees.

Figure 9:
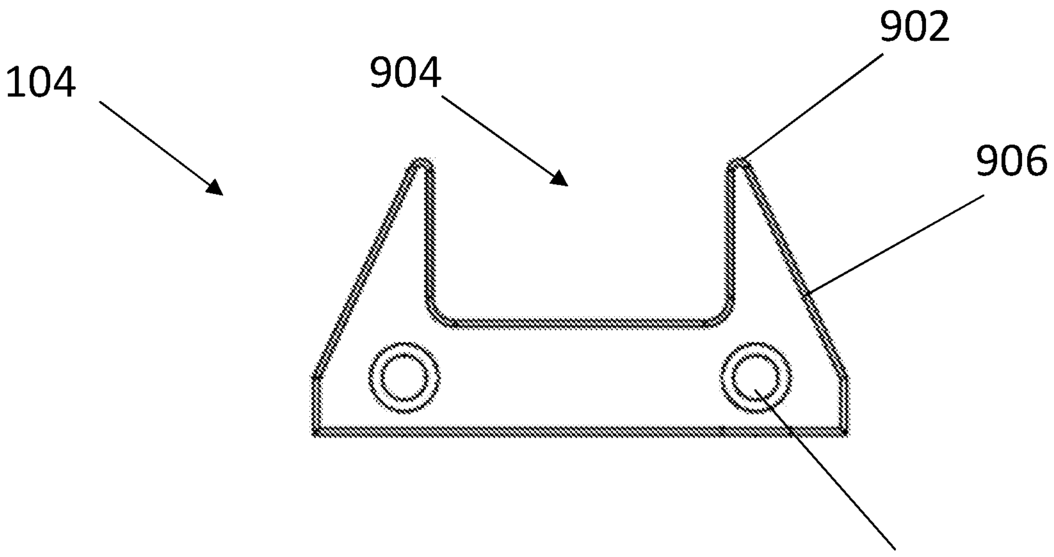
FIG. 9 shows an end-view of an attachment member from the door system of FIG. 1.

FIG. 9 shows an end-view of the attachment member 104. Shown in FIG. 9 are fixing points 900 for attachment to a respective end-cap 110. Also shown are opposing jaws 902, which define a recess 904 therebetween. When the door system is assembled, the channel 108 of the door leaf 102 will be received in the recess 904. Moreover, because the spacing of the jaws 902 is equal to an outer diameter of the aluminium tube which forms the channel 108, there is no cap provided therebetween. Therefore, the interface between the door leaf 102 and the attachment member 104 includes no ligature points. Moreover, because the jaws 902 have sloped outer surfaces 906, ligature points are further eliminated. The attachment member 104 is formed of aluminium.

Figure 10:
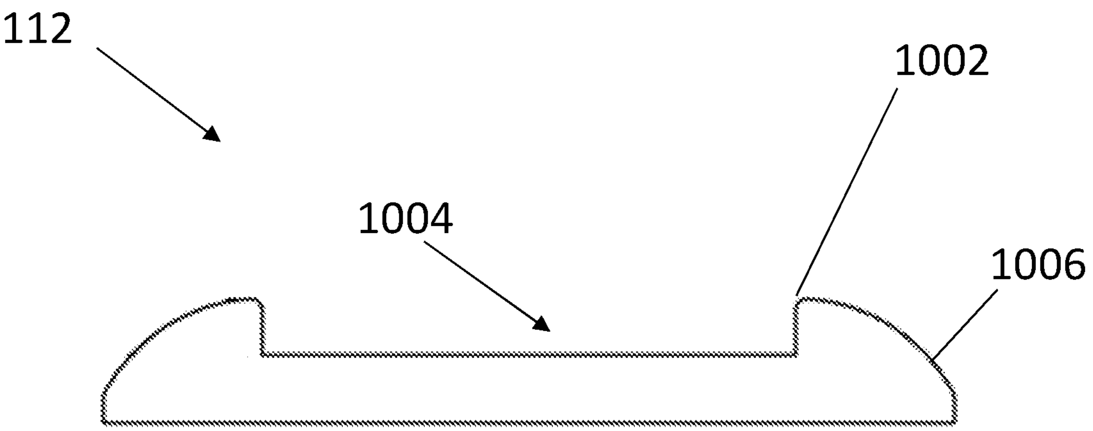
FIG. 10 shows an end-view of a fixing member from the door system of FIG. 1.

FIG. 10 shows an end-view of the rubber fixing member 112. Similarly to the attachment member, the rubber fixing member comprises opposing jaws 1002, which define a recess 1004 therebetween. When the door system is assembled, the attachment member 104 will be received in the recess 1004. Moreover, because the spacing of the jaws 1002 is equal to an outer diameter of the attachment member 104, there is no gap provided therebetween. Therefore, the interface between the attachment member 104 and the rubber fixing member 112 includes no ligature points. Moreover, because the jaws 1002 have sloped and rounded outer surfaces 1006, ligature points are further eliminated.

The door leaf 102 typically has a total height of roughly 1.5 m. That is to say, the channel 108 typically has a height of 1.5 m. The door leaf 102 typically has a depth (as measured from the channel in a direction perpendicular to the channel) of approximately 0.78 m. The aluminium tube of the channel typically has an outer diameter of 26 mm, and an inner diameter of 20 mm. Accordingly, the hinge pin 106 typically has a diameter of 20 mm and a height of 1514 mm (so as to protrude slightly from the top and bottom ends of the channel when assembled). The jaws 902 of the attachment member 104 are typically spaced from one another by 26 mm. The flexible composite material 400 of the door leaf 102 typically has a thickness of 2.5 mm. As the reader will understand, these measurements may be changed as required.

Also disclosed herein are a number of further examples according to the following numbered clauses.

Clause 1. A door leaf formed of a flexible material having high tensile strength, such that the door leaf is flexible, resistant to puncture, and resistant to tearing.

Clause 2. The door system of any preceding Clause, wherein the flexible material has a tensile strength of at least 300 MPa.

Clause 3. The door system of Clause 1 or Clause 3, wherein the flexible material comprises aramid fibre.

Clause 4. The door system of any preceding Clause, wherein the flexible material comprises woven aramid fibre.

Clause 5. The door system of any preceding Clause, further comprising a skin covering the flexible material.

Clause 6. The door leaf of Clause 5, wherein the skin comprises a polymer.

Clause 7. The door leaf according to any preceding Clause, further comprising a channel extending along an edge thereof, for receiving a hinge pin.

Clause 8. The door leaf of Clause 7, wherein the channel comprises a rigid tube attached to the flexible material.

Clause 9. The door leaf of Clause 8 when dependent on Clause 4 or Clause 5, wherein the skin covers the flexible material and the rigid tube.

Clause 10. The door system according to any of Clause 7 to 9, wherein a top edge of the door leaf forms an acute angle with the channel.

Clause 11. A door system comprising a door leaf according to any preceding claim, an attachment member, and an attachment means, wherein the attachment means rotationally couples the door leaf to the attachment member.

Clause 12. The door system of Clause 11, wherein the attachment means is configured to restrict rotation of the door leaf relative to the attachment member to less than 180 degrees.

Clause 13. The door system of Clause 12, wherein the attachment means is configured to restrict rotation of the door leaf relative to the attachment member to less than 150 degrees.

Clause 14. The door system of Clause 13, wherein the attachment means is configured to restrict rotation of the door leaf relative to the attachment member to less than 130 degrees.

Clause 15. The door system according to any of Clauses 12 to 14, wherein the attachment means comprises a hinge pin and an end-cap, the hinge pin extending through a channel in the door leaf, and the end-cap being attached to the attachment member, and wherein an end of the hinge pin is received within the end-cap to thereby rotationally couple the door leaf to the attachment member.

Clause 16. The door system of Clause 15, wherein the attachment member comprises a recess configured to receive the channel.

Clause 17. The door system of Clause 16, wherein an outer diameter of the channel is equal to a width of the recess.

Clause 18. The door system according to any of Clauses 15 to 17, wherein one of the end-cap and the hinge pin comprises at least one detent arranged to restrict rotation of the hinge pin to thereby restrict the rotation of the door leaf relative to the attachment member.

Clause 19. The door system of Clause 18, wherein the other of the end-cap and the hinge pin comprises a corresponding protrusion, wherein the at least one detent is arranged to engage the protrusion to thereby restrict the rotation of the hinge pin.

Clause 20. The door system of Clause 19, wherein the at least one detent and the protrusion are concealed within the end-cap.

Clause 21. A door system comprising a door leaf, an attachment member, and an attachment means, wherein the attachment means rotationally couples the door leaf to the attachment member and is configured to restrict rotation of the door leaf relative to the attachment member to less than 180 degrees.

It is to be understood that the above description is intended to be illustrative, and not restrictive. Many other implementations will be apparent to those of skill in the art upon reading and understanding the above description.

Although the present disclosure has been described with reference to a specific example implementation, it will be recognized that the disclosure is not limited to the implementations described, but can be practiced with modification and alteration insofar as such modification(s) and alteration(s) remain within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A door system comprising:

a door leaf, an attachment member comprising a top end and a bottom end, and an attachment assembly, wherein the attachment assembly rotationally couples the door leaf to the attachment member and is configured to restrict rotation of the door leaf relative to the attachment member to no more than 180 degrees;

wherein the attachment assembly comprises:

a hinge pin, a top end-cap attached to the top end of the attachment member, the top end-cap presenting a first side, a second side, a top surface disposed between the first side and the second side, and a bottom surface opposite the top surface, wherein a top end of the hinge pin is received within the bottom surface of the top end-cap to thereby rotationally couple the door leaf to the attachment member, and wherein the top end-cap has the top surface sloped outwardly at an angle and downwardly relative to a vertical axis of the hinge pin such that the top end-cap does not present a ligature point, thereby preventing an object from being anchored to the top end-cap.

2. The door system of claim 1, wherein the attachment assembly further comprises a bottom end-cap attached to the bottom end of the attachment member, wherein a bottom end of the hinge pin is received within the bottom end-cap, and wherein the top end-cap and the bottom end-cap are identical to one another.

3. The door system of claim 1, wherein the door leaf comprises a channel extending along an edge thereof, wherein the channel receives the hinge pin.

4. The door system of claim 3, further comprises a bottom end-cap, wherein at least one of the top end-cap or the bottom end-cap abuts a respective end of the channel.

5. The door system of claim 4, wherein the attachment member comprises a recess configured to receive the channel.

6. The door system of claim 5, wherein an outer diameter of the channel is equal to an inner width of the recess.

7. The door system of claim 1, further comprising a bottom end-cap, wherein one of the top end-cap or the bottom end-cap and the hinge pin comprises at least one detent arranged to restrict a rotation of the hinge pin relative to the attachment member.

8. The door system of claim 1, wherein a top edge of the door leaf forms an acute angle with respect to the attachment member.

9. The door system of claim 1, wherein at least one corner of the door leaf is rounded.

10. The door system of claim 1, wherein the door leaf is bendable.

11. The door system of claim 1, wherein the attachment assembly is configured to restrict rotation of the door leaf relative to the attachment member to less than 150 degrees.

12. The door system of claim 1, further comprising a fixing member comprising opposing jaws defining a recess therebetween, the fixing member configured for attachment between the attachment member and a wall or a door frame.

13. The door system of claim 12, further comprising a bottom end-cap, wherein at least one of the top end-cap or the bottom end-cap comprises fixing points for attachment to the fixing member.

14. The door system of claim 1, wherein the vertical axis is a central vertical axis.

15. The door system of claim 3, wherein the channel comprises a core layer sandwiched between a first skin layer and a second skin layer.

16. The door system of claim 15, wherein the core layer comprises an aramid fibre and the first skin layer and the second skin layer comprise plasticized PVC-coated woven nylon fabric.

17. The door system of claim 15, wherein the channel comprises a hollow aluminium tube.

18. The door system of claim 15, wherein an interface between the channel and the core layer is rounded.

19. The door system of claim 7, wherein the hinge pin comprises a protrusion configured to engage the at least one detent, thereby limiting the rotation of the hinge pin.

20. The door system of claim 19, wherein the at least one detent comprises a first detent and a second detent arranged on opposing sides of the top end-cap or the bottom end-cap.

* * * * *